United States Patent
Kennedy et al.

[11] Patent Number: 5,903,603
[45] Date of Patent: *May 11, 1999

[54] MODEM TRAINING APPARATUS AND METHOD

[75] Inventors: Paul Roy Kennedy, Mesa; William Chun-Hung Yip, Scottsdale; Timothy Gerard Hall, Mesa, all of Ariz.

[73] Assignee: Motorola, Inc., Schaumburg, Ill.

[*] Notice: This patent is subject to a terminal disclaimer.

[21] Appl. No.: 08/791,429

[22] Filed: Jan. 27, 1997

[51] Int. Cl.⁶ .................................................. H04B 1/38
[52] U.S. Cl. .......................................... 375/222; 455/427
[58] Field of Search ................................ 375/219, 220, 375/222, 211, 212; 455/13.1

[56] References Cited

U.S. PATENT DOCUMENTS

| | | | |
|---|---|---|---|
| 4,621,366 | 11/1986 | Cain et al. | 375/8 |
| 4,815,128 | 3/1989 | Malek | 380/9 |
| 4,837,812 | 6/1989 | Takahashi et al. | 379/98 |
| 4,922,546 | 5/1990 | Takahashi et al. | 455/74 |
| 5,041,917 | 8/1991 | Koshiishi | 358/434 |
| 5,133,081 | 7/1992 | Mayo | 455/18 |
| 5,321,722 | 6/1994 | Ogawa | 375/8 |
| 5,504,802 | 4/1996 | Kennedy et al. | 379/58 |

Primary Examiner—Temesghen Ghebretinsae
Assistant Examiner—Albert C. Park
Attorney, Agent, or Firm—Gregory J. Gorrie

[57] ABSTRACT

A secure communications system (501) including a local digital terminal (510) coupled to an interworking function (538). The interworking function (538) couples the digital radio network (121) to a PSTN (542, 546, 548) and a remote analog communication terminal (552). The system (501) includes a novel method of establishing an end-to-end communication channel between local digital (510) and remote analog (552) terminals wherein the local digital terminal establishes (510) a direct digital channel (121) between itself (510) and the interworking function (538) and transmits a message describing its signaling capabilities to the interworking function (538). The interworking function (538) then trains its modem with the modem of the remote analog terminal (552) such that signaling capabilities of the local digital terminal (510) and the remote analog terminal (552) are not violated. By moving modem training procedures to the interworking function (538), signal processing delays in the local digital terminal (510) do not adversely affect the success of establishing the end-to-end communication channel.

14 Claims, 7 Drawing Sheets

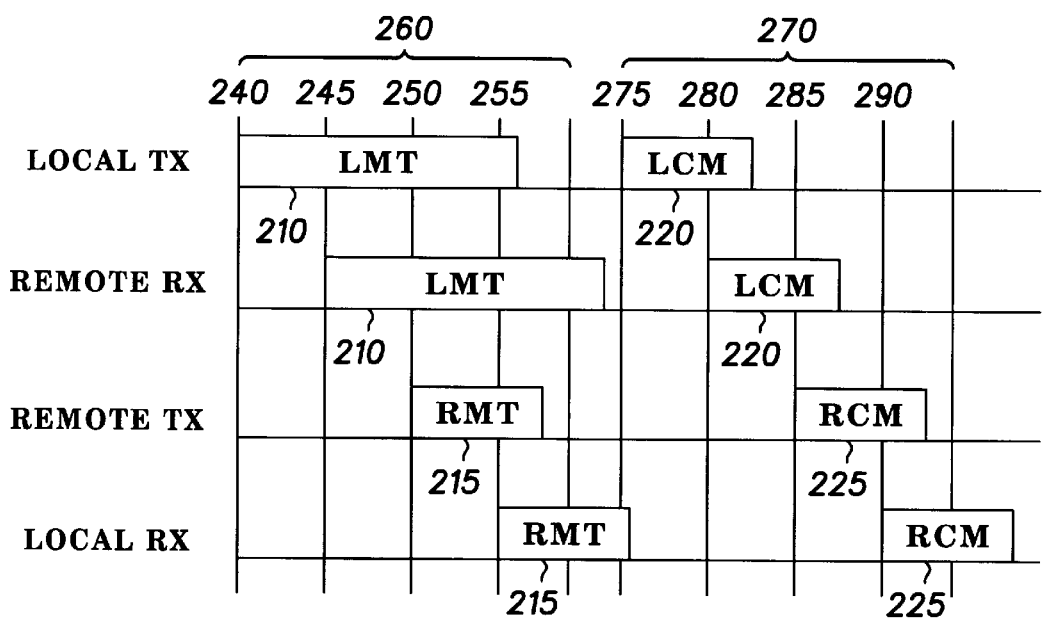
FIG. 2 — PRIOR ART —
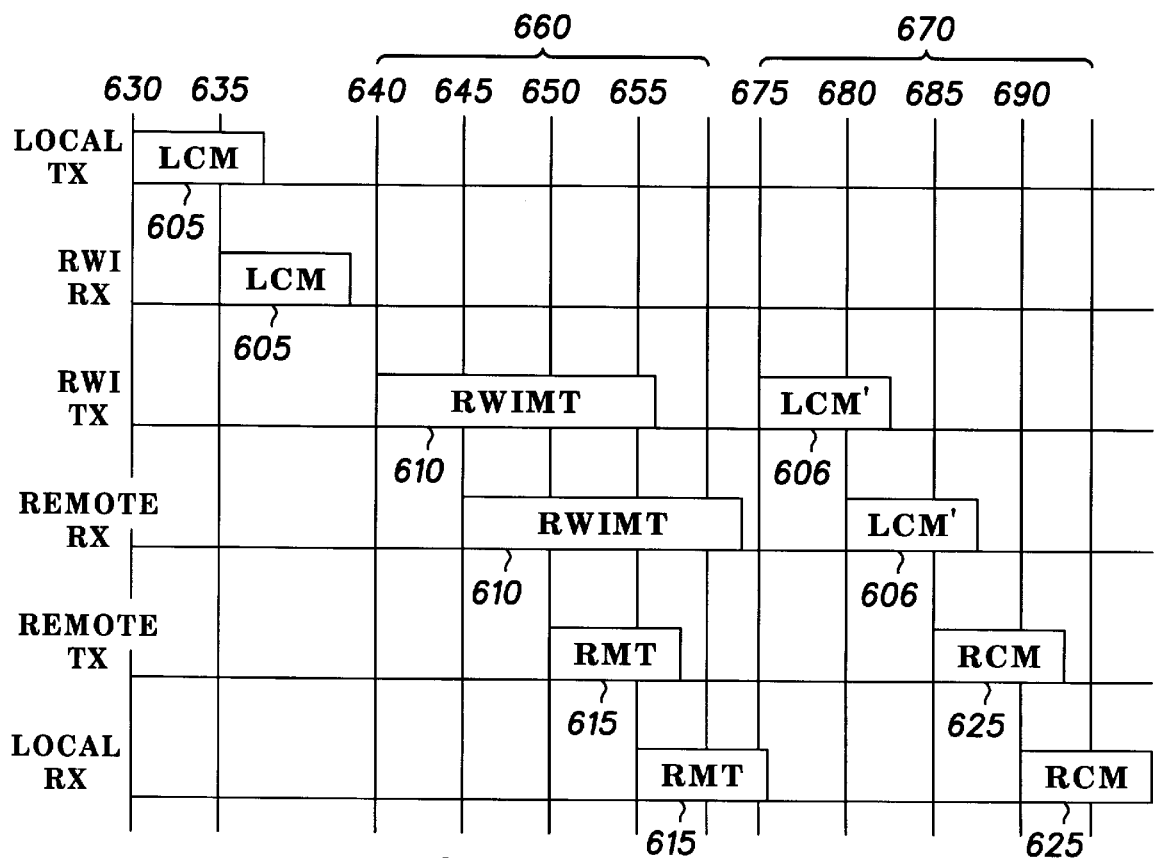
FIG. 6

MODEM TRAINING APPARATUS AND METHOD

FIELD OF THE INVENTION

This invention relates in general to the field of modem training between digital and other communications systems, in particular to modem training between digital and analog communications system and more particularly to modem training between a secure digital communication system coupled by radio and/or landline communication equipment to an analog secure communications system.

BACKGROUND OF THE INVENTION

A "local terminal" is defined herein to mean a communication device which is the initiator of an attempt to establish a communication channel with another communication device. A "remote terminal" is defined herein to mean a communication device which is the responder to an attempt by the local digital terminal to establish a communication channel.

For example, a secure telephone unit (STU) is capable of establishing a "secure" communication channel with another STU. Secure communications comprises encrypting, transmitting, receiving and decrypting data. The modem training procedure begins when one STU "initiates" the establishment of the secure communication channel (e.g., the user of one STU presses the "secure" button).

Communication system 101 comprises local terminal 110, modems 114, 138, radio units 118, 132, 134, public switched telephone network 141 (PSTN), analog links 112, 140, 150, RF digital links 120', digital links 116, 136 and remote terminal 152. PSTN 141 comprises, for example, communication satellites 131 and terrestrial telephone networks 142, 146, 148 (TTNs). TTNs 142, 146, 148 may communicate with communication satellites 131 via RF analog links 144. TTNs 142, 146, 148 may alternatively be interconnected via wirelines (not illustrated in FIG. 1). Links 112, 116, 136, 140 and 150 are wireline links and links 144 are RF satellite links. Radio unit 118 is coupled to radio unit 134 via RF digital network 120'.

Local digital terminal 110 and remote analog terminal 152 produce digital bitstreams modulated by internal modems (not illustrated, FIG. 1), providing modulated carriers transmissible via analog links 112 and 150, respectively. For example, when local digital terminal 110 and remote analog terminal 152 are STUs, their internal modems may produce encrypted modulated carriers. Modulated carriers received via analog links 112 and 150 are demodulated by the internal modems of local digital terminal 110 and remote analog terminal 152 to produce digital bitstreams that may be processed by terminals 110, 152.

Modems 114, 138 modulate incoming digital bitstreams and demodulate incoming modulated carriers. As a result, signals communicated via analog links 112, 140, 150 are modulated carriers and signals communicated via RF digital networks 120' and digital links 116, 136 are digital bitstreams.

Signals communicated via RF digital networks 120' may be limited to bandwidths as low as 2400 bits per second (bps). For example, local digital terminal 110, analog link 112, modem 114, digital link 116 and radio unit 118 may be located off shore, or may be mobile land- or air-based units or may be fixed. Radio unit 134, digital link 136, modem 138, analog links 140, 150, PSTN 142 and remote analog terminal 152 may be land-based equipment. Additionally, signals communicated via RF digital network 120' are processed to include error correction/detection information and this is done by processing data from several frames of digitized information. The net effect is for digital network 120' to add group delay of on the order of a half-second to the transmitted digital signals.

A "system delay" is defined herein to mean a delay associated with a communication path between system nodes (e.g., radio unit 118, PSTN 142 etc.) or between a system node and other communication apparatus. Multiple delays and system nodes may exist within local digital terminal 110 and/or between local digital terminal 110 and interworking function (IWF) 138. Additional delays may exist between IWF 138 and remote analog terminal 152.

To establish a digital communication link within conventional communication system 101, the internal modem of local digital terminal 110 must "train" with the internal modem of remote analog terminal 152 to adaptively equalize the line and set near and far echo taps for echo cancellation. This is all performed digitally within the internal modems as part of the modem training procedure. Near the beginning of the modem training procedure, messages describing modem capabilities may be exchanged between internal modems so that the internal modems may determine a desired data rate, among other things. For some modes of operation, capabilities messages need not be exchanged.

FIG. 2 represents the timing of modem training messages exchanged between local digital terminal 110 and remote analog terminal 152 for an operative configuration of conventional communication system 101. As used in FIG. 2 (and FIGS. 5 and 6 and associated text, infra), "tx" is an abbreviation for "transmit" and "rx" is an abbreviation for "receive".

Referring also to FIG. 1 and associated text, the modem training procedure is initiated by local digital terminal 110. Modems 114 and 138 increase the propagation time of the modem training signals through communication system 101. For example, modem 114 requires approximately 0.5 seconds to detect local modem tone 210 (referred to also as LMT). Other than adding delay, modems 114 and 138 are transparent during the modem training procedure between local digital terminal 110 and remote analog terminal 152.

Local digital terminal 110 transmits local modem tone 210 to remote analog terminal 152 beginning at time 240. For example, local modem tone 210 may be a 2100 Hz tone of limited duration. Local digital terminal 110 continues transmission of local modem tone 210 until local digital terminal 110 begins reception of remote modem tone 215 (referred to also as RMT).

Remote analog terminal 152 receives local modem tone 210 beginning at time 245. Remote analog terminal 152 may then wait a certain signaling delay time and transmit remote modem tone 215 to local digital terminal 110 beginning at time 250. For example, remote modem tone 215 may be a P1800 Hz tone of limited duration. A P1800 (or "Pseudo" 1800) Hz tone consists of alternations of dibits 00 and 10, corresponding to +45 degree and −45 degree phase shifts, respectively.

Local digital terminal 110 receives remote modem tone 215 beginning at time 255. First response time-out interval 260, monitored by local digital terminal 110, begins at time 240 when local digital terminal 110 starts transmitting local modem tone 210. Local digital terminal 110 "fails the call" (e.g., hangs up) if it does not begin receiving remote modem tone 215 within first response time-out interval 260. Alternatively, local digital terminal 110 may re-initiate the modem training procedure to attempt to establish communications with remote analog terminal 152.

Capabilities messages 220, 225 are exchanged by local digital terminal 110 and remote analog terminal 152 indicating the "capabilities" of each terminal's internal modem. The exchanged capabilities messages 220, 225 are interpreted according to a predetermined hierarchy to arrive at negotiated parameters (e.g., data rate, etc.) which determine how further communications will be handled. Capabilities messages 220, 225 contain information the terminals use to select a common mode of operation (e.g., a negotiated data rate of 4800 bits per second).

Local digital terminal 110 transmits local capabilities message 220 (referred to also as LCM) beginning at time 275. Remote analog terminal 152 receives local capabilities message 220 beginning at time 280.

Remote analog terminal 152 transmits remote capabilities message 225 (referred to also as RCM) beginning at time 285. Remote capabilities message 225 is received by local digital terminal 110 beginning at time 290. Second response time-out interval 270, monitored by local digital terminal 110, begins at time 275, when local digital terminal 110 starts transmitting local capabilities message 220. Local digital terminal 110 fails the call if it does not begin receiving remote capabilities message 225 within second response time-out interval 270. Alternatively, local digital terminal 110 may re-initiate the modem training procedure to attempt to establish communications with remote analog terminal 152.

FIG. 3 is a flow diagram of a prior art protocol for local terminal modem training and capabilities message exchange. Referring also to FIGS. 1 and 2 and associated text, local terminal modem training and capabilities message exchange begins (block 310) when local digital terminal 110 transmits local modem tone 210 (block 315). Local digital terminal 110 starts an internal timer (block 320) when it begins transmission of local modem tone 210. Local digital terminal 110 then determines whether the internal timer value exceeds first response time-out interval 260 (block 325). When the internal timer value exceeds first response time-out interval 260 (block 325), local digital terminal 110 assumes remote analog terminal 152 is nonexistent or incapable of establishing communications and local digital terminal 110 fails the call (block 355), thus terminating the modem training procedure. For example, 3.3+/−0.7 seconds is a standard first response time-out interval within the telecommunications industry.

When the internal timer value does not exceed first response time-out interval 260 (block 325), local digital terminal 110 determines whether remote modem tone 215 has been received (block 330). When remote modem tone 215 has not been received (block 330), local digital terminal 110 again determines whether first response time-out interval 260 has been exceeded (block 325). The procedure then iterates as shown in FIG. 3.

When remote modem tone 215 has been received (block 330), local digital terminal 110 transmits local capabilities message 220 (block 335). Local digital terminal 110 starts an internal timer (block 340) when it begins transmission of local capabilities message 220. Local digital terminal 110 then determines whether the internal timer value exceeds second response time-out interval 270 (block 345). For example, 2.2 seconds is a standard second response time-out interval within the telecommunications industry.

When the internal timer value exceeds second response time-out interval 270 (block 345), local digital terminal 110 assumes that remote analog terminal 152 is inoperative and local digital terminal 110 fails the call (block 355), thus terminating the modem training procedure.

When the internal timer value does not exceed second response time-out interval 270 (block 345), local digital terminal 110 determines whether remote capabilities message 225 has been received (block 350). When remote capabilities message 225 has not been received (block 350), local digital terminal 110 again determines whether second response time-out interval 270 has been exceeded (block 345). The procedure then iterates as shown in FIG. 3.

When remote capabilities message 225 has been received (block 350), local digital terminal 110 continues the modem training procedure (block 360) at the negotiated data rate and in accordance with the requirements of the internal modems of local digital terminal 110 and remote analog terminal 152.

FIG. 4 is a flow diagram of a prior art protocol for remote terminal modem training and capabilities message exchange. Referring also to FIGS. 1 and 2 and associated text, remote terminal modem training and capabilities message exchange begins (block 410) when remote analog terminal 152 receives local modem tone 210 (block 415). Remote analog terminal 152 then waits a required signaling delay time (block 420). For example, a required signaling delay time may be zero seconds (no delay) or one second. After the required signaling delay time has expired (block 420), remote analog terminal 152 transmits remote modem tone 215 (block 425).

Remote analog terminal 152 then determines whether local capabilities message 220 has been received (block 440). When local capabilities message 220 has not been received, remote analog terminal 152 continues to monitor incoming data until local capabilities message 220 is received. When remote analog terminal 152 receives local capabilities message 220 (block 440), remote analog terminal 152 transmits remote capabilities message 225 (block 445). Remote analog terminal 152 then continues the modem training procedure (block 450) at the negotiated data rate and in accordance with the requirements of the internal modems of local digital terminal 110 and remote analog terminal 152.

A signal transmitted by a local digital terminal (e.g., local digital terminal 110, FIG. 1) in response to a signal received from an analog or other terminal (e.g., remote analog terminal 152) experiences a time delay before it is received by a remote analog terminal (e.g., remote analog terminal 152, FIG. 1). The time delay results from the signal propagation time to, and also signal processing time within, the local digital terminal and transmission delays back to the remote analog terminal. The propagation delay length depends on the distances between the terminals and delays within intervening equipment.

In some settings, interoperability performance requirements dictate that digital and analog STUs support a secure communications link between a digital STU (e.g., local digital communications terminal 110, FIG. 1) and an analog STU (e.g., remote analog communications terminal 152) via PSTN 142. Additionally, it is not uncommon encounter system delays between a terminal (e.g., local digital terminal 110, FIG. 1) and a PSTN interface (e.g., modem 138, FIG. 1). Therefore, a message may be transmitted through multiple devices and links before reaching a final destination. Each device and link contributes additional time delay to the total message propagation time.

Table 1 summarizes approximate timing delays inherent in the inoperative configuration of conventional communication system 101 (FIG. 1). As used in Table 1, "start" is the element number in FIG. 1 where the delay originates and "end" is the element number in FIG. 1 where the delay ends.

TABLE 1

CONVENTIONAL COMMUNICATION SYSTEM TIMING DELAYS

| start | end | delay explanation | delay |
|---|---|---|---|
| 110 | 114 | local tone detect time | .5 sec |
| 114 | 138 | dig. wireless net. del. | .6 sec |
| 138 | 152 | two satellite hops | .6 sec |
| 152 | 138 | two satellite hops | .6 sec |
| 138 | 114 | dig. wireless net. del. | .6 sec |
| 114 | | detect of remote tone | .1 sec |
| 114 | 110 | modem processing delay | .1 sec |
| | | total | 3.1 sec |

The total round trip delay of up to 3.1 seconds for a system having a digital local terminal 110 exceeds the standard second response time-out interval of 2.2 seconds. Thus, the prior art signaling/training protocol does not work with the digital wireless network delay plus two satellite hops between a digital local terminal 110 and an analog remote analog terminal 152.

With only two total satellite hops between local digital terminal 110 and remote analog terminal 152, the total round trip delay is 3.1 seconds. Therefore, the prior art protocol does not work with two analog terminals 110, 152.

A significant drawback of the prior art protocol is that modem training response time-out intervals for a particular communications system may limit the total delay allowable within local digital terminal 110 and also between local digital terminal 110 and remote analog terminal 152 to as little as one or two satellite hops and then may not accommodate additional timing delays encountered in digital RF networks. However, for some applications, communications ability across a combination of satellite hops and digital RF network delays is desirable.

Thus, what are needed are (i) a practical, economical method and (ii) a similar apparatus, each allowing successful modem training to occur when a digital local terminal 110 is attempting to reliably establish communication with an analog remote terminal, or vice versa. What are particularly needed are (i) a modem training method and (ii) a similar apparatus, each allowing communication via a PSTN coupled by a RF digital radio link.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference characters refer to similar items throughout the figures and:

FIG. 2 is a timing diagram of a prior art protocol for modem training and capabilities message exchange;

FIG. 6 is a timing diagram of a method of modem training and capabilities message exchange, in accordance with the teachings of the present invention;

The exemplification set out herein illustrates a preferred embodiment of the invention in one form thereof and such exemplification is not intended to be construed as limiting in any manner.

DETAILED DESCRIPTION OF THE DRAWINGS

In general, any terminal (or, as is used interchangeably therewith herein, "communications terminal") with data transmission and reception capabilities may operate as either an initiator (local digital terminal) or as a responder (remote analog terminal). Therefore, designation of a particular terminal as "local" or "remote", and of specific attributes associated with these labels, in the description of the present invention is not intended to be limiting in any manner.

Figure 5:
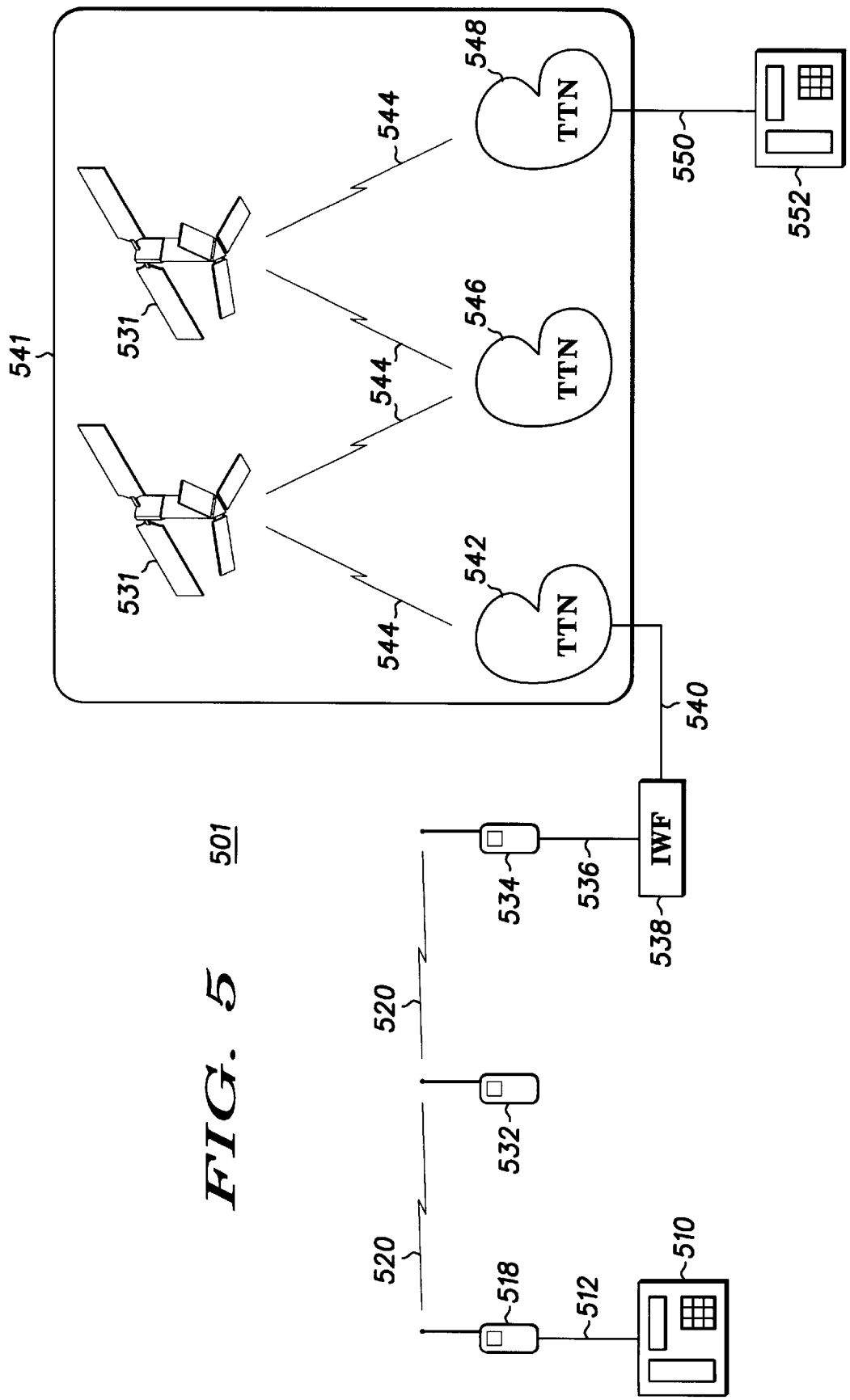
FIG. 5 is a simplified block diagram of an apparatus for a communication system whereby a digital terminal and an analog terminal are coupled together, in accordance with the teachings of the present invention.

FIG. 5 depicts a preferred embodiment of communication system 501. Communication system 501 comprises local terminal 510, radio units 518, 532, 534, interworking function 538 (IWF), PSTN 541, analog links 540, 550, RF digital network 520, digital links 512, 536 and remote terminal 552. PSTN 541 comprises communication satellites 531 and TTNs 542, 546, 548. TTNs 542, 546, 548 may communicate with communication satellites 531 via RF analog links 544. TTNs 542, 546, 548 may also be inter-connected via wirelines (not illustrated in FIG. 5).

For example, local digital terminal 510 and remote analog terminal 552 may be STUs that encrypt/transmit and receive/decrypt data (e.g., digitized voice data, facsimile data, digital computer data etc.), thus providing secure communications. IWF 538 is a communication device interfacing between a digital radio network (e.g., radio units 518, 534 and RF digital network 520) and a PSTN (e.g., PSTN 542). IWF 538 contains an internal modem (not illustrated in FIG. 5).

A "link" is defined herein to mean a communication path between system nodes (e.g., radio units 518, 534 or PSTN 542). A "channel" is defined herein to mean a communication path between one communication device (e.g., local digital terminal 510, remote analog terminal 552 or IWF 538) and another.

Local digital terminal 510 and remote analog terminal 552 produce digital bitstreams. Used in conjunction with IWF 538, local digital terminal 510 may establish a direct digital bitstream channel between local digital terminal 510 and IWF 538. The direct digital bitstream channel between local digital terminal 510 and IWF 538 is referred to hereinafter as the "digital channel". The "end-to-end communication channel" is defined herein to mean a communication channel between local digital terminal 510 and remote analog terminal 552.

The bitstream produced by remote analog terminal 552 is modulated by its internal modem to produce a modulated carrier that may be transmitted via analog link 550.

A modulated carrier received via analog link 550 is demodulated by the internal modem of remote analog terminal 552 to produce a digital bitstream that may be processed by remote analog terminal 552. Signals communicated via analog links 540, 550 are modulated carriers and signals communicated via RF digital network 520 and digital links 512, 536 are digital bitstreams.

For example, local digital terminal 510, digital link 512 and radio units 518, 532 may be located anywhere, for example, off shore, or may be mobile land- or air-based units. Radio unit 534, digital link 536, IWF 538, PSTN 542, analog links 540, 550 and remote analog terminal 552 may be land-based equipment.

In the prior art, an internal modem of a local digital terminal was required to train with an internal modem of a remote analog terminal. Because there is a direct digital channel between local digital terminal 510 and IWF 538, local digital terminal 510 may use the internal modem of IWF 538 to communicate over PSTN 542. Therefore, the modem training task may be moved from local digital terminal 510 to IWF 538. Because the modem training task is moved to IWF 538, message propagation delay times between local digital terminal 510 and IWF 538 do not affect the modem training procedure. Only message propagation delay times between IWF 538 and remote analog terminal 552 affect the modem training procedure.

To establish an end-to-end communication channel, the internal modem of IWF 538 must train with the internal modem of remote analog terminal 552 to adaptively equalize the line and set near and far echo taps for echo cancellation. This is all performed digitally within the internal modems as part of the modem training task.

Near the beginning of the modem training procedure, capabilities messages may be exchanged between internal modems so that the internal modems determine a desired data rate. For some modes of operation, capabilities messages need not be exchanged.

Use of IWF 538 allows an end-to-end communication channel to be established between local digital terminal 510 and remote analog terminal 552 despite differences in delay associate with these two types of terminals, without violating timing constraints associated with established protocols for modem training or capabilities message exchange.

FIG. 6 depicts message timing for a modem training and capabilities message exchange protocol in accordance with the present invention.

Modem training data rate determination is partially a function of the total available end-to-end communication channel bandwidth. The end-to-end communication channel bandwidth depends on the bandwidth of the digital channel and the bandwidth of PSTN 542. Because the bandwidth of the digital channel is generally lower than the bandwidth of PSTN 542, the bandwidth of the digital channel determines the rate of modem training for remote analog terminal 552. For example, when the digital channel bandwidth is 4800 bps and PSTN 542 bandwidth is 9600 bps, the allowable end-to-end modem training data rate is 4800 bps or lower.

For example, local digital terminal 510 may determine the digital channel bandwidth by sampling the clock rate of the digital radio network link. Alternatively, local digital terminal 510 may have predetermined the digital channel bandwidth, and local digital terminal 510 may have it configured into memory.

Local capabilities message 605 has digital channel bandwidth information. Therefore, for successful modem training between IWF 538 and remote analog terminal 552, IWF 538 must use the local signaling capabilities contained in local capabilities message 605 during the modem training procedure with remote analog terminal 552. In accordance with the present invention, IWF 538's internal modem is capable of supporting equal or higher bit rates than the digital channel.

Local digital terminal 510 transmits local capabilities message 605 (referred to also as LCM) to IWF 538 beginning at time 630. Transmission of local capabilities message 605 occurs prior to the modem training procedure (e.g., as soon as local digital terminal 510 goes off-hook).

IWF 538 receives local capabilities message 605 beginning at time 635. Receipt of local capabilities message 605 "pre-stages" IWF 538 for subsequent modem training with remote analog terminal 552.

The modem training procedure is initiated by IWF 538. For example, when local digital terminal 510 is a STU, IWF 538 initiates the modem training procedure when local digital terminal 510 informs IWF 538 that the user of local digital terminal 510 pressed the "secure" button. IWF 538 transmits IWF modem tone 610 (referred to also as IWFMT) to remote analog terminal 552 beginning at time 640. IWF 538 continues transmission of IWF modem tone 610 until IWF 538 begins reception of remote modem tone 615 (referred to also as RMT). For example, IWF modem tone 610 may be a 2100 Hz tone of limited duration.

Remote analog terminal 552 receives IWF modem tone 610 beginning at time 645. Remote analog terminal 552 may then wait a certain signaling delay time and transmit remote modem tone 615 to IWF 538 beginning at time 650. For example, remote modem tone 615 may be a P1800 Hz tone of limited duration.

IWF 538 receives remote modem tone 615 beginning at time 655. First response time-out interval 660, monitored by IWF 538, begins at time 640, when IWF 538 starts transmitting IWF modem tone 610. IWF 538 fails the call if it does not begin receiving remote modem tone 615 within first response time-out interval 660. Alternatively, IWF 538 may re-initiate the modem training procedure to attempt to establish communications with remote analog terminal 552.

Capabilities messages 606, 625 are exchanged between IWF 538 and remote analog terminal 552. Reformatted local capabilities message 606 (referred to also as LCM') represents a reformatted version of local capabilities message 605 received by IWF 538 at time 635. Remote analog capabilities message 625 (referred to also as RCM) transmitted by remote analog terminal 552 indicates the modem capabilities of remote analog terminal 552. Capabilities messages 606, 625 contain information which IWF 538 and remote analog terminal 552 use to select a common mode of operation (e.g., 4800 bit per second, secure data mode).

IWF 538 transmits reformatted local capabilities message 606 beginning at time 675. Remote analog terminal 552 receives reformatted local capabilities message 606 beginning at time 680.

Remote analog terminal 552 transmits remote capabilities message 625 beginning at time 685. Remote capabilities message 625 is received by IWF 538 beginning at time 690. Second response time-out interval 670, monitored by IWF 538, begins at time 675, when IWF 538 starts transmitting reformatted local capabilities message 606. IWF 538 fails the call if it does not begin receiving remote capabilities message 625 within second response time-out interval 670. Alternatively, IWF 538 may re-initiate the modem training procedure to attempt to establish communications with remote analog terminal 552.

FIG. 6 depicts message timing when local digital terminal 510 goes off-hook before remote analog terminal 552 goes off-hook. When remote analog terminal 552 goes off-hook first, message timing depicted in FIG. 6 is the same. A link is established between remote analog terminal 552 and IWF 538 when remote analog terminal 552 goes off-hook and dials the telephone number for local digital terminal 510. IWF 538 sends a "digital ring" to local digital terminal 510 until local digital terminal 510 goes off-hook. When local digital terminal 510 goes off-hook, local digital terminal 510 begins transmission of local capabilities message 605. Message exchange and timing continues in accordance with FIG. 6 and associated text.

Figure 7:
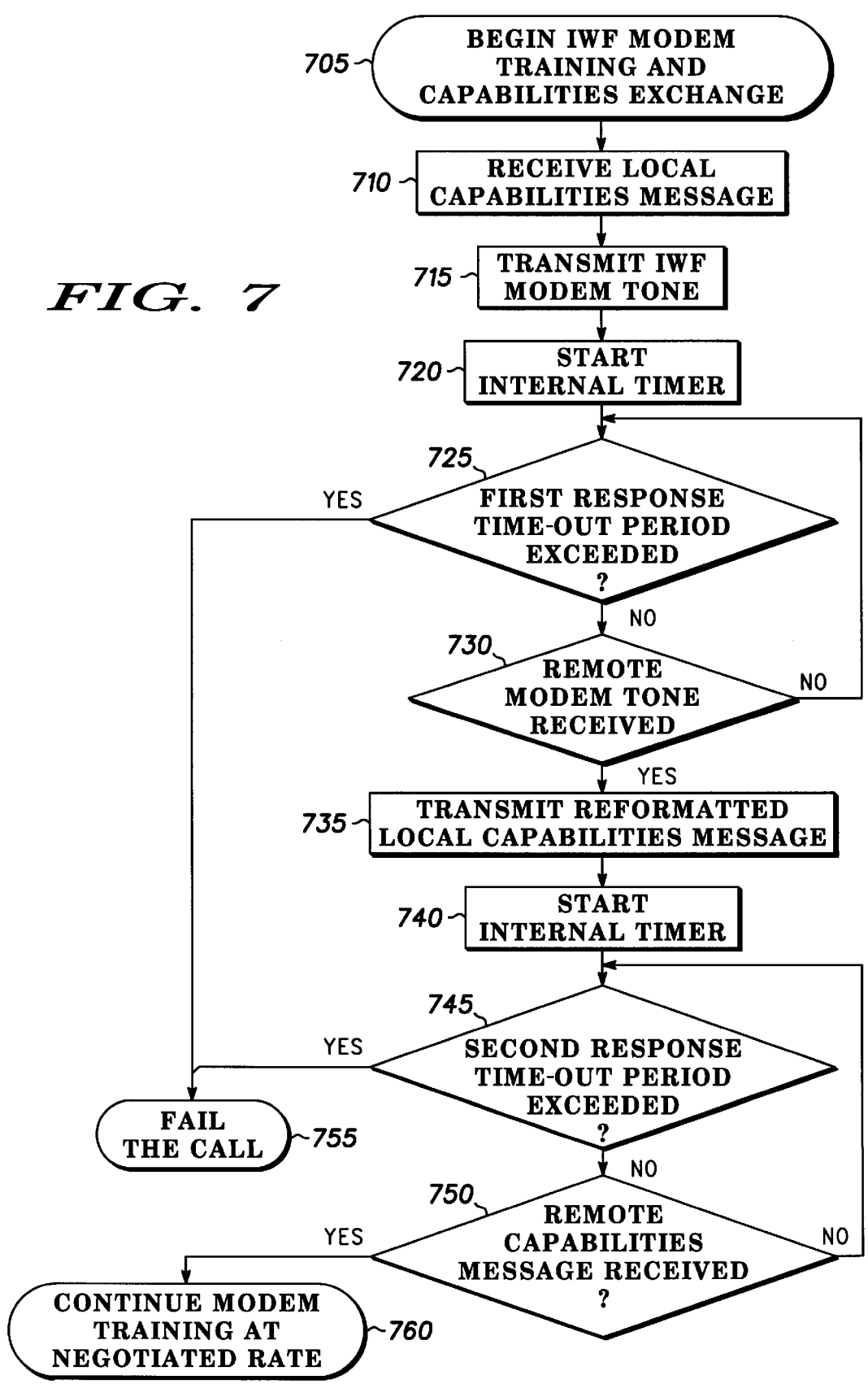
FIG. 7 is a flow diagram of a method of IWF modem training and capabilities message exchange, in accordance with the teachings of the present invention.

FIG. 7 is a flow diagram of a preferred embodiment method of IWF modem training and capabilities message exchange. Referring also to FIGS. 5 and 6 and associated text, IWF modem training and capabilities message exchange begins (block 705) when IWF 538 receives local capabilities message 605 (block 710) from local digital terminal 510. IWF 538 must train its modem in accordance with local capabilities message 605 because the digital channel must eventually be capable of supporting the selected mode of operation.

IWF 538 initiates the modem training procedure between itself and remote analog terminal 552 by transmitting IWF modem tone 610 (block 715). IWF 538 starts an internal timer (block 720) when it begins transmission of IWF modem tone 610. IWF 538 then determines (block 725) whether the internal timer value exceeds first response time-out interval 660 (block 725). When the internal timer value exceeds first response time-out interval 660 (block 725), IWF 538 assumes remote analog terminal 552 is nonexistent or incapable of establishing communications and IWF 538 fails the call (block 755), thus terminating the modem training procedure. For example, 3.3+/−0.7 seconds is a standard first response time-out interval within the telecommunications industry.

When the internal timer value does not exceed first response time-out interval 660 (block 725), IWF 538 determines whether remote modem tone 615 has been received (block 730). When remote modem tone 615 has not been received (block 730), IWF 538 again determines whether first response time-out interval 660 has been exceeded (block 725). The procedure iterates as shown in FIG. 7 (blocks 725, 730) until the call is failed (block 755) due to a time out or until the remote modem tone is received (blocks 730, 735).

Determination of whether the internal timer value exceeds first response time-out interval 660 (block 725) and determination of whether remote modem tone 615 has been received (block 730) may be performed in either order.

When remote modem tone 615 has been received (block 730), IWF 538 transmits reformatted local capabilities message 606 (block 735).

In alternate embodiments, additional modem training messages may be exchanged prior to transmission of reformatted local capabilities message 606. Exchange of additional modem training messages prior to transmission of reformatted local capabilities message 606 does not limit the effectiveness of the present invention. Additionally, some systems do not require exchange of reformatted local capabilities message 606 and remote capabilities message 625. In such embodiments, the capabilities of one internal modem are already known to the other internal modem. The method of the present invention is applicable for such systems, as timing constraints during exchange of local modem tone 610 and remote modem tone 615 still exist.

IWF 538 starts an internal timer (block 740) when transmission of reformatted local capabilities message 606 begins. IWF 538 then determines whether the internal timer value exceeds second response time-out interval 670 (block 745). For example, 2.2 seconds is a standard second response time-out interval within the telecommunications industry.

When the internal timer value exceeds second response time-out interval 670 (block 745), IWF 538 fails the call (block 755), thus terminating the modem training procedure.

When the internal timer value does not exceed second response time-out interval 670 (block 745), IWF 538 determines whether remote capabilities message 625 has been received (block 750). When remote capabilities message 625 has not been received (block 750), IWF 538 again determines whether second response time-out interval 670 has been exceeded (block 745). The procedure then iterates as shown in FIG. 7.

Determination of whether the internal timer value exceeds second response time-out interval 670 (block 745) and determination of whether remote capabilities message 625 has been received (block 750) may be performed in either order.

When remote capabilities message 625 has been received (block 750), IWF 538 continues the modem training procedure (block 760) at the negotiated data rate and in accordance with the requirements of the internal modems of IWF 538 and remote analog terminal 552.

The method of the present invention is different from the prior art because the method of the present invention allows local digital terminal 510 to use the modem of IWF 538 to communicate with the modem of remote analog terminal 552. IWF 538 trains its modem with the modem of remote analog terminal 552 using signaling capabilities of local digital terminal 510.

Because local digital terminal 510 uses the modem of IWF 538, message propagation delays between local digital terminal 510 and IWF 538 do not affect the modem training procedure. Therefore, the method of the present invention allows more delay to exist between local digital terminal 510 and IWF 138 than prior art protocols allow.

Figure 8:
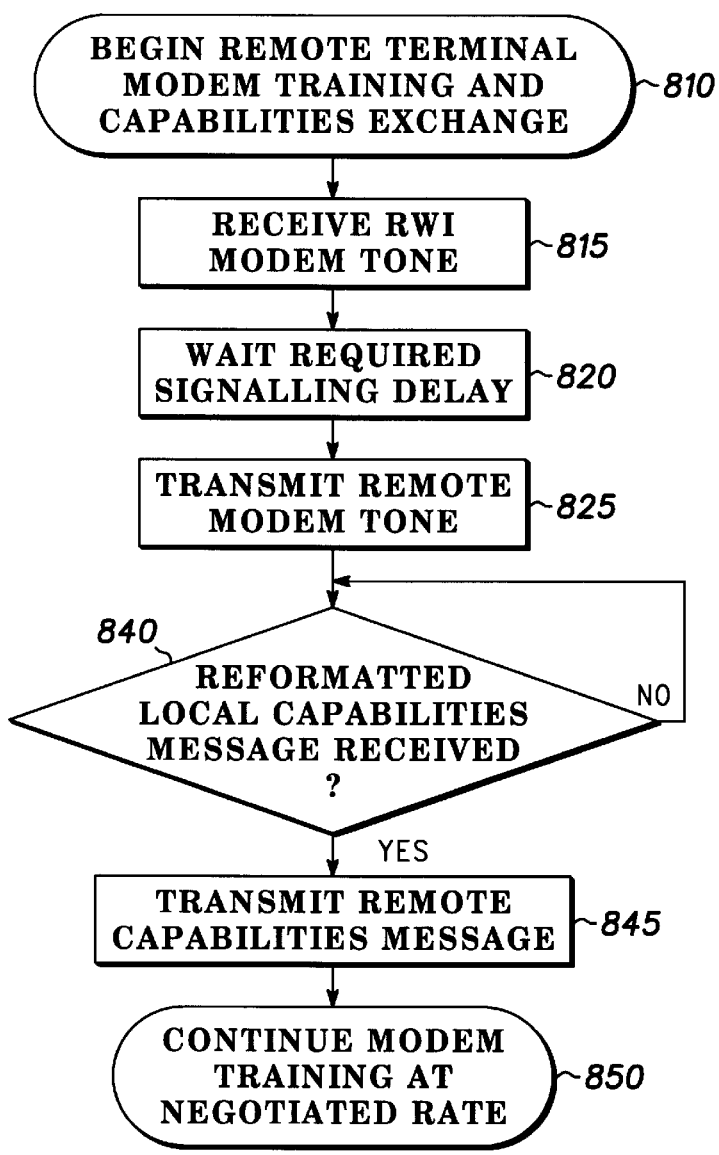
FIG. 8 is a flow diagram of a method of remote terminal modem training and capabilities message exchange, in accordance with the teachings of the present invention.

FIG. 8 is a flow diagram of a preferred protocol of remote analog terminal modem training and capabilities message exchange. Referring also to FIGS. 5 and 6 and associated text, remote analog terminal modem training and capabilities message exchange begins (block 810) when remote analog terminal 552 receives IWF modem tone 610 (block 815). Remote analog terminal 552 then waits a required signaling delay time (block 820). For example, a required signaling delay time may be zero seconds (no delay) or one second. After the required signaling delay time has expired (block 820), remote analog terminal 552 transmits remote modem tone 615 (block 825).

Remote analog terminal 552 then determines whether reformatted local capabilities message 606 has been received (block 840). When reformatted local capabilities message 606 has not been received, remote analog terminal 552 continues to monitor until reformatted local capabilities message 606 is received. When remote analog terminal 552 receives reformatted local capabilities message 606 (block 840), remote analog terminal 552 transmits remote capabilities message 625 (block 845). Remote analog terminal 552 then continues the modem training procedure (block 850) at the negotiated data rate and in accordance with the requirements of the internal modems of IWF 538 and remote analog terminal 552.

The method of remote terminal modem training and capabilities message exchange is different from the prior art protocol because the source of the modem tone received in block 815 is different. This difference is transparent to remote analog terminal 552.

Figure 1:
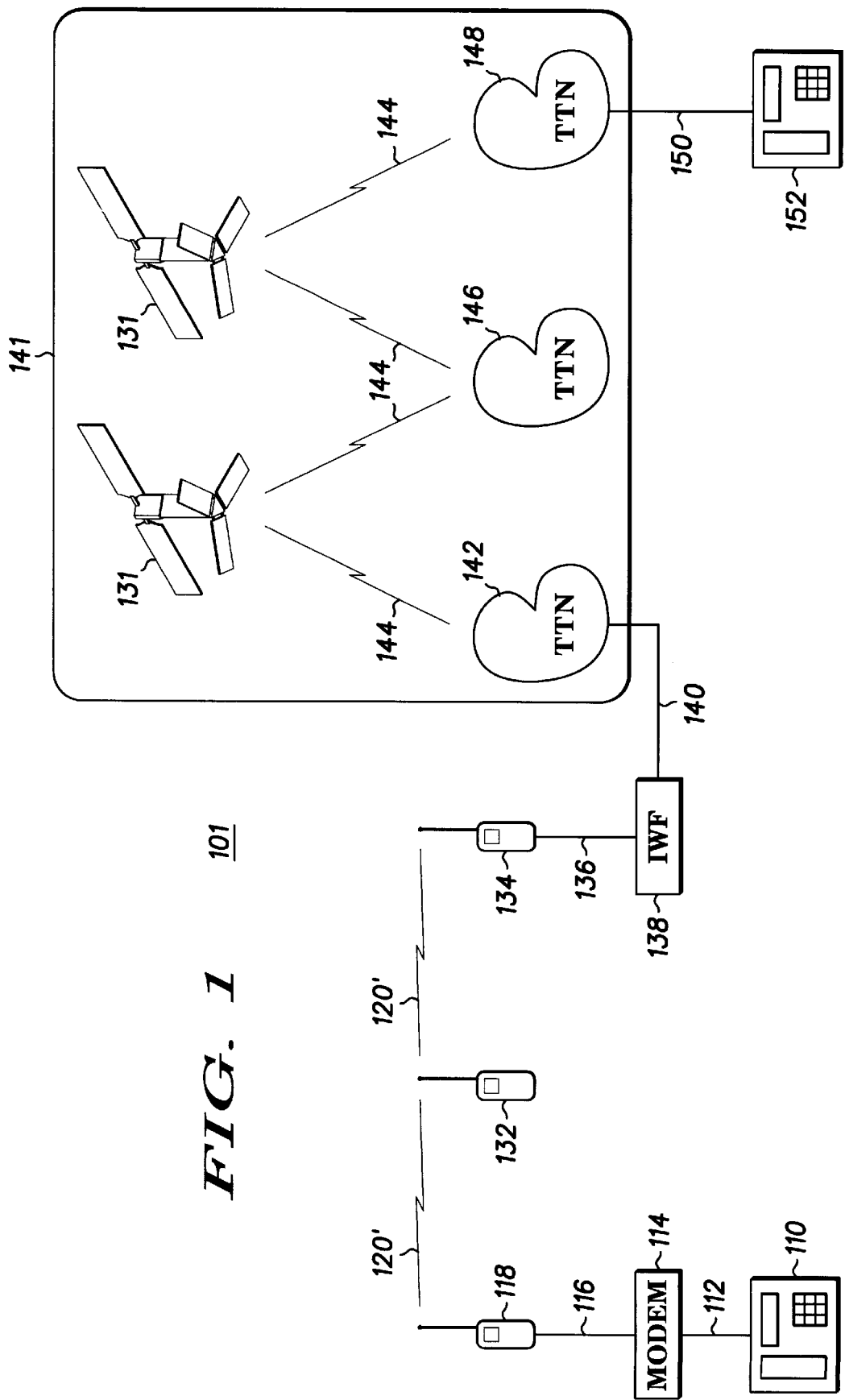
FIG. 1 is a simplified block diagram of an apparatus for an inoperative configuration of a conventional communication system whereby a digital terminal and an analog terminal are coupled together.
Figure 3:
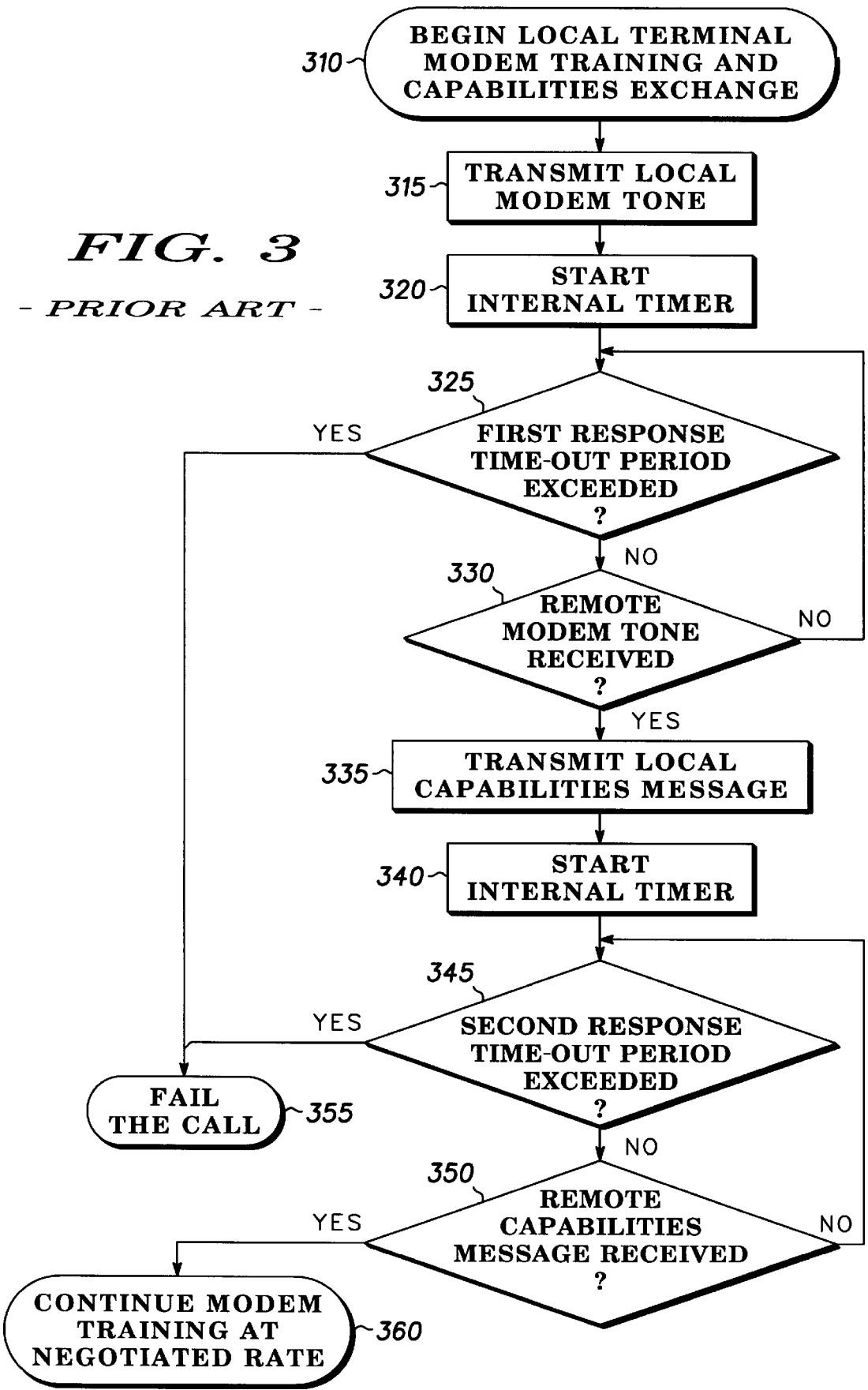
FIG. 3 is a flow diagram of a prior art protocol for local digital terminal modem training and capabilities message exchange.
Figure 4:
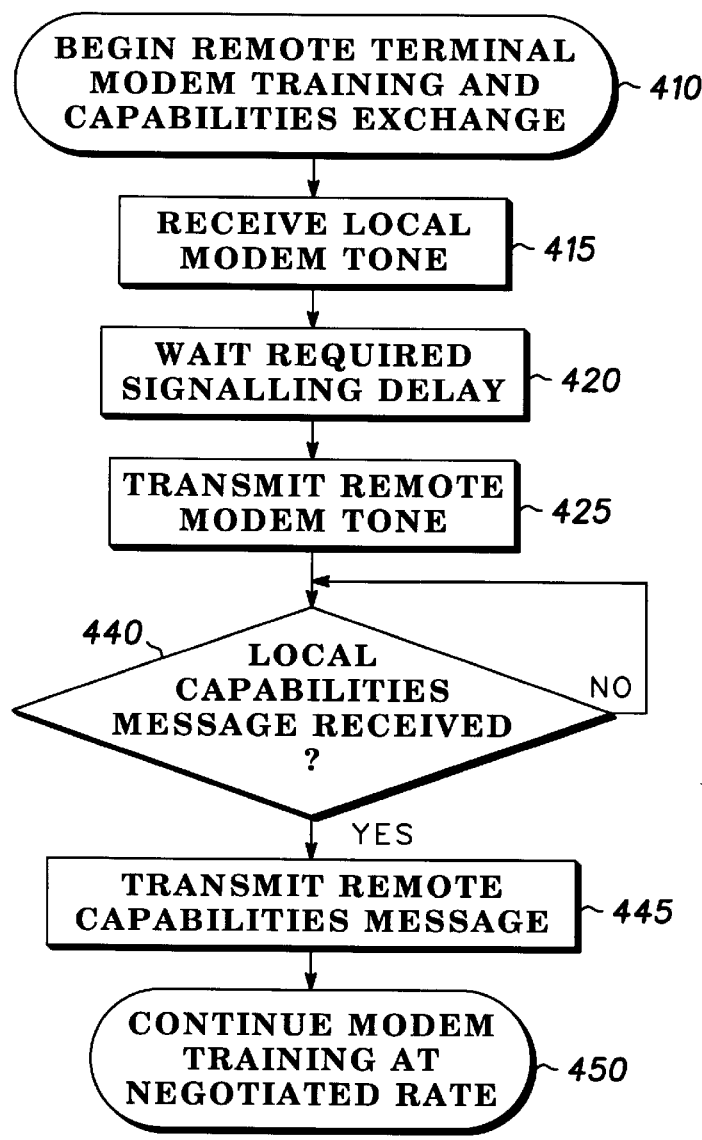
FIG. 4 is a flow diagram of a prior art protocol for remote terminal modem training and capabilities message exchange.
Figure 9:
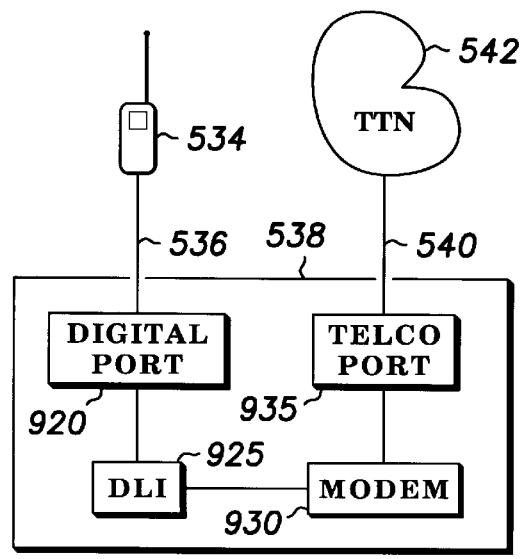
FIG. 9 is a simplified block diagram of an apparatus for an interworking function, in accordance with the teachings of the present invention.

FIG. 9 illustrates a preferred embodiment of IWF 538 in accordance with the present invention. IWF 538 comprises digital data port 920 (referred to hereinafter as digital port 920), digital link interface 925 (referred to hereinafter as DLI 925), internal modem 930 and telephone company port 935 (referred to hereinafter as telco port 935).

Referring also to FIGS. 5 and 6 and associated text, IWF 538 has digital port 920 connected to radio unit 534 via link 536. Digital port 920 connects to DLI 925. DLI 925 receives and formats local capabilities message 605. DLI 925 then transmits reformatted local capabilities message 606 during the modem training procedure. DLI 925 also performs error handling, traffic control for internal modem 930 and digital port 920, interrupt handling, call setup signaling and other control functions. Internal modem 930 modulates digital bitstreams from DLI 925 for transmission over PSTN 542. Internal modem 930 also demodulates incoming modulated carriers received from PSTN 542. Internal modem 930 is coupled to telco port 935. Telco port 935 connects IWF 538 to PSTN 542 via link 540.

For example, internal modem 930 is usefully a Type STU-III modem available from Motorola (Scottsdale Ariz.), AT&T or Lockheed Martin. Internal modem 930 is built according to FSVS-210 specifications. DLI 925 is usefully a Type M68302 communication processor available from Motorola of Austin Tex. Digital port 920 is usefully a standard RS-232-E synchronous digital port and telco port 935 is usefully a standard 2 wire/4 wire telco interface port corresponding to FCC-68.

Figure 10:
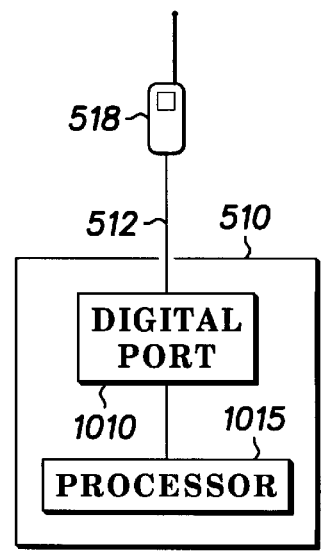
FIG. 10 is a simplified block diagram of an apparatus for a digital terminal, in accordance with the teaching of the present invention.

FIG. 10 illustrates a preferred embodiment of local digital terminal 510 in accordance with the present invention. Referring also to FIGS. 5 and 6 and associated text, local digital terminal 510 comprises digital port 1010 and processor 1015. Processor 1015 sends local capabilities message 605 to IWF 538 when a digital communication link is desired.

Radio unit 518 is coupled to digital port 1010 via link 512 and to radio unit 134 via RF digital network 520. Processor 1015 creates and manipulates digital bitstreams that are sent and received through digital port 1010. Local digital terminal 510, used in accordance with the present invention, differs from a prior art local digital terminal because it has the ability to establish a direct digital link with another communication device (e.g., IWF 538) and send its local capabilities message 605.

Processor 1015 is usefully a Type DSP5600x digital signal processor available from Motorola of Austin Tex. Digital port 1010 is usefully a standard RS-232-E synchronous digital port.

By transmitting local terminal capabilities message 605 to IWF 538 prior to the modem training procedure, the method of the present invention moves the modem training timing constraints from local digital terminal 510 to IWF 538 and allows modem training and capabilities message exchange to occur in systems with more delay internal to a digital terminal than is associated with analog STUs without violating signaling timing constraints.

After local terminal capabilities message 605 has been transmitted by local digital terminal 510, the order in which modem training messages are exchanged between remote analog terminal 552 and IWF 538 is not critical to the present invention. The order in which modem training messages are exchanged described in the detailed description is not to be construed as limiting in any manner.

The number or length of delays between local digital terminal 510 and IWF 538 is not limited to any particular value for the present invention to be useful because modem training timing constraints only apply between IWF 538 and remote analog terminal 552. The maximum total delay between IWF 538 and remote analog terminal 552 is limited by the modem training timing constraints of the communication system.

EXAMPLE

Table 2 summarizes approximate timing delays inherent in preferred embodiment communication system 501 depicted in FIG. 5. As used in Table 2, "start" is the element number in FIG. 5 where the delay originates and "end" is the element number in FIG. 5 where the delay ends.

TABLE 2

PREFERRED EMBODIMENT COMMUNICATION SYSTEM TIMING DELAYS

| start | end | delay explanation | delay |
|---|---|---|---|
| 538 | 552 | two satellite hops | .6 sec |
| 552 | 538 | two satellite hops | .6 sec |
| 538 | | modem processing delay | .1 sec |
| | | total | 1.3 sec |

The total round trip delay between IWF 538 and remote analog terminal 552 is 1.3 seconds which is within the standard second response time-out interval of 2.2 seconds. This means that the preferred embodiment solution works with normal analog STU delays on the PSTN (e.g., PSTN 542) side and delays associated with digital STUs on the radio side.

It is appreciated by those of skill in the art that the improved modem training method and apparatus described above allows an end-to-end communication channel to be established when digital and analog terminals are coupled together. This ability allows greater communication range between the local digital and remote analog terminals in a communication system.

What is claimed is:

1. A communication system apparatus for transmitting and receiving data, said apparatus comprising:
   a) an interworking function;
   b) a local digital communication terminal for transmitting and receiving data linked to said interworking function said local digital communication terminal, including a local signaling capability; and
   c) a remote analog communication terminal for transmitting and receiving data linked to said interworking function through a public switched telephone network, said remote analog communication terminal comprising a remote internal modem with remote modem capabilities, wherein:

said interworking function is for:
- (i) receiving a local signaling capabilities message including said channel capabilities transmitted by said local digital communication terminal, prior to establishment of a connection between said local digital communication terminal and said remote analog communication terminal; and
- (ii) initiating a modem training procedure between said interworking function and said remote internal modem when a round-trip delay between said local digital communication terminal and said remote analog communication terminal exceeds a timeout period.

2. A communication system apparatus as claimed in claim 1, wherein said interworking function comprises:
- a)i) a digital data port for (i) transmitting and (ii) receiving digital data, said digital data port adapted to interface with said local digital communication terminal via a digital radio link;
- a)ii) an interworking function internal modem for:
  - (i) receiving said local signaling capabilities message; and
  - (ii) initiating said modem training procedure between said interworking function and said remote internal modem;
- a)iii) a telephone company interface for (i) transmitting and (ii) receiving telephone network data, said telephone company interface coupled to said interworking function internal modem and adapted to interface with said remote analog communication terminal; and
- a)iv) a digital link interface for performing processing and control functions, said digital link interface coupled to said digital data port and to said interworking function internal modem, said digital link interface for:
  - (i) receiving said local signaling capabilities message; and
  - (ii) formatting said local signaling capabilities message into a reformatted signaling capabilities message, wherein:
  - said interworking function internal modem uses said reformatted signaling capabilities message during said modem training procedure between said interworking function internal modem and said remote internal modem.

3. A communication system apparatus as claimed in claim 1 wherein said local digital communication terminal comprises:
- b)i) a local digital data port for (i) transmitting and (ii) receiving digital data, said digital data port adapted to interface with said interworking function via said digital radio link; and
- b)ii) a processor coupled to said local digital data port, said processor for transmitting said local signaling capabilities message to said interworking function prior to said modem training procedure between said interworking function and said remote internal modem.

4. A method for controlling a local digital communication terminal while establishing a communication link between said local digital communication terminal and a remote analog communication terminal through an interworking function, said local digital communication terminal having local signaling capabilities, said remote analog communication terminal comprising a remote internal modem with remote modem capabilities, said interworking function comprising an interworking function internal modem, said method comprising steps of:
- a) establishing a direct digital communication link between said local digital communication terminal and said interworking function; and
- b) transmitting, by said local digital communication terminal, a local signaling capabilities message describing said local signaling capabilities prior to a modem training procedure between said interworking function internal modem and said remote internal modem.

5. A method for controlling an interworking function in a communication system comprising a local digital communication terminal linked to said digital radio network, a remote analog communication terminal linked to a public switched telephone network, wherein said interworking function is linked to said local digital communication terminal and said interworking function is linked to said remote analog communication terminal through said public switched telephone network and at least one radio frequency link, said local digital communication terminal having local signaling capabilities including channel capabilities of said digital radio network, said remote analog communication terminal comprising a remote internal modem with remote modem capabilities and said interworking function comprising an interworking function internal modem, said method comprising steps of:
- a) receiving by said interworking function a local signaling capabilities message describing said local signaling capabilities from said local digital communication terminal prior to establishment of a connection between said local digital communication terminal and said remote analog communication terminal;
- b) formatting by said interworking function said local signaling capabilities message into a reformatted signaling capabilities message; and
- c) performing said modem training procedure between said interworking function internal modem and said remote internal modem.

6. A method as claimed in claim 5, wherein said step c) comprises substeps of:
- c)i) initiating said modem training procedure between said interworking function internal modem and said remote internal modem by sending a local modem tone from said interworking function to said remote internal modem after receiving said local signaling capabilities message by said interworking function;
- c)ii) initializing a first running timer to a first running timer value at a time when said initiating step commences;
- c)iii) comparing said first running timer value to a first delay time-out value;
- c)iv) determining whether a remote modem tone from said remote internal modem has been received by said interworking function;
- c)v) discontinuing said modem training procedure when said first running timer value exceeds said first delay time-out value and said local modem tone has not been received;
- c)vi) transmitting said reformatted signaling capabilities message to said remote internal modem when said local modem tone is received and said first running timer value has not exceeded said first delay time-out value;
- c)vii) initializing a second running timer to a second running timer value at a time when said transmitting step commences;
- c)viii) comparing said second running timer value to a second delay time-out value;

c)ix) determining whether a remote modem capabilities message describing said remote modem capabilities has been received by said interworking function;

c)x) discontinuing said modem training procedure when said second running timer value exceeds said second delay time-out value and said remote modem capabilities message has not been received; and c)xi) continuing said modem training procedure when said remote modem capabilities message is received and said second running timer value has not exceeded said second delay time-out value.

7. A method of establishing a communication link in a communication system including a local digital communication terminal, a remote analog communication terminal and an interworking function, said local digital communication terminal including a local internal modem and local signaling capabilities, said local digital communication terminal linked to said interworking function through a radio link, said remote analog communication terminal including a remote internal modem with remote modem capabilities, said remote analog communication terminal linked to said interworking function through at least one public switched telephone network, and said interworking function including an interworking function internal modem, said method comprising steps of:

a) sending a local signaling capabilities message describing said local signaling capabilities from said local digital communication terminal to said interworking function prior to establishment of a connection between said local digital communication terminal and said remote analog communication terminal;

b) formatting said local signaling capabilities message by said interworking function into a reformatted signaling capabilities message which is consistent with a format required during a modem training procedure between said interworking function internal modem and said remote internal modem; and c) performing said modem training procedure between said interworking function internal modem, said local internal modem, and said remote internal modem.

8. A method as claimed in claim 7, wherein step c) comprises substeps of:

c)i) initiating said modem training procedure between said interworking function internal modem and said remote internal modem by sending a local modem tone from said interworking function internal modem to said remote internal modem;

c)ii) receiving said local modem tone by said remote internal modem;

c)iii) sending a remote modem tone from said remote internal modem;

c)iv) receiving said remote modem tone by said interworking function internal modem;

c)v) sending said reformatted signaling capabilities message from said interworking function;

c)vi) receiving said reformatted signaling capabilities message by said remote internal modem;

c)vii) sending a remote modem capabilities message describing said remote modem capabilities from said remote internal modem;

c)viii) receiving said remote modem capabilities message by said interworking function internal modem; and c)ix) continuing said modem training procedure in accordance with a modem training protocol between said remote internal modem, said local internal modem, and said interworking function internal modem.

9. An interworking function apparatus comprising:

a digital data port for transmitting and receiving digital data from a local digital communication terminal linked to said digital data port through a radio link;

a telephone company port for transmitting and receiving telephone data from a remote analog communication terminal linked to said telephone company port through a public switched telephone network;

an interworking function internal modem coupled to said telephone company port, said interworking function internal modem for training with a remote internal modem of a remote analog communication terminal and for modulating and demodulating data going to and coming from said telephone company port; and a digital link interface coupled to said digital data port and coupled to said interworking function internal modem, wherein said digital link interface is for:

i) receiving a local signaling capabilities message describing local signaling capabilities from a local digital communication terminal through said digital data port prior to establishment of a connection between said local digital communication terminal and said remote analog communication terminal;

ii) formatting said local signaling capabilities message into a reformatted signaling capabilities message; and iii) allowing access to said reformatted signaling capabilities message by said interworking function internal modem, said interworking function internal modem transmitting said reformatted signaling capabilities message through said telephone company port to said remote internal modem during said modem training procedure between said interworking function internal modem and said remote internal modem.

10. A local digital communication terminal apparatus for communicating in a communication system including an interworking function and a remote analog communication terminal, said local digital communication terminal comprising:

a digital data port for interfacing said local digital communication terminal apparatus with a modem; and a processor coupled to said digital data port, said processor for:

i) formatting a local signaling capabilities message describing local signaling capabilities of said local digital communication terminal apparatus; and ii) transmitting said local signaling capabilities message via said digital data port to said interworking function prior to a modem training procedure between said local digital communication terminal apparatus and said remote analog communication terminal, wherein said interworking function is linked to said local digital communication terminal through a radio link, and said interworking function transmits information contained in said local signaling capabilities message to said remote analog communication terminal.

11. An interface apparatus including a first modem, said interface apparatus for use in a communications system including a first terminal separated from said interface apparatus by a radio communications link having a first bandwidth, wherein said radio communications link includes a first delay, and wherein said communications system includes a second terminal separated from said interface apparatus by a telephone link having a second bandwidth, wherein said second terminal includes a second modem adapted for training with said first modem, wherein said telephone link includes a second delay, said end to end delay comprising a sum of said first delay, twice said second delay and a third delay associated with said first terminal, said interface apparatus comprising:

a digital port;

a digital link interface coupled to said digital port and to said first modem; and a telephone port coupled to said first modem, wherein said first modem is configured for:
  a. receiving a local capabilities message from said first terminal via said digital communications link;
  b. reformatting said local capabilities message to provide a reformatted local capabilities message;
  c. transmitting said reformatted local capabilities message via said telephone link; and
  d. initiating training between said first modem and said second modem to determine a mutual communications protocol.

12. An interface apparatus as claimed in claim 11, wherein said apparatus includes a timer coupled to said first modem, said timer for measuring a first interval of a first duration, wherein, when said second delay exceeds said first interval, communication between said first and second modems is terminated and said operation (d) is not carried out.

13. An interface apparatus as claimed in claim 11, wherein said apparatus includes bandwidth assessing means for assessing said first bandwidth to provide a first assessed bandwidth, said bandwidth assessing means coupled to said first modem, and wherein said first assessed bandwidth is assessed in part based on reception of said local capabilities message, said operation (c) is carried out at a data rate consistent with said first assessed bandwidth and said operation (d) is carried out at said data rate.

14. An interface apparatus as claimed in claim 11, wherein said apparatus includes a timer coupled to said first modem, said timer for measuring a first interval of a first duration, wherein, when said end to end delay exceeds said first interval and said second delay is less than said first interval, proceeding to said operation (d).

* * * * *